(12) United States Patent
Dong et al.

(10) Patent No.: US 7,392,823 B2
(45) Date of Patent: Jul. 1, 2008

(54) COMBINATION VALVE

(75) Inventors: Xingen Dong, Greeneville, TN (US); Albert C. Ellenburg, Greeneville, TN (US); Frank P. Holzschuh, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 280 days.

(21) Appl. No.: 11/291,357

(22) Filed: Dec. 1, 2005

(65) Prior Publication Data
US 2006/0112993 A1  Jun. 1, 2006

Related U.S. Application Data

(60) Provisional application No. 60/632,280, filed on Dec. 1, 2004.

(51) Int. Cl.
*F16K 17/196* (2006.01)
(52) U.S. Cl. .................. 137/493.6; 137/493.9
(58) Field of Classification Search ........... 137/493, 137/493.4, 493.5, 493.6, 493.9
See application file for complete search history.

(56) References Cited

U.S. PATENT DOCUMENTS

| 3,112,763 A | 12/1963 | Tennis et al. |
| 4,210,170 A | 7/1980 | Sutton |
| 4,300,591 A | 11/1981 | Sutton |
| 5,139,047 A | 8/1992 | Reinicke |
| 6,056,263 A | 5/2000 | Stier |
| 6,691,512 B1 | 2/2004 | Kopel et al. |
| 6,719,005 B1 | 4/2004 | Trimble et al. |
| 6,761,182 B1 | 7/2004 | Trimble et al. |

FOREIGN PATENT DOCUMENTS

GB    2 064 069 A    6/1981

*Primary Examiner*—Stephen M Hepperle
(74) *Attorney, Agent, or Firm*—Joseph J. Pophal; Daniel J. Whitman

(57) ABSTRACT

Improvement in a combination valve including check valve and pressure relief valve portions for regulating fluid flow pressure and direction in a hydraulic circuit, wherein a valve seat includes, in addition to a central aperture, a plurality of peripherally-spaced axial cross-port orifice holes, of same or differing diameter and a plurality of intersecting, circumferentially-spaced, radial, semicircular holes; a spring cap including four adjoining axial portions of differing outer diameters, with a first portion being a protrusion that locates an end of a relief valve compression spring, a second portion having flat outer tool locating surfaces used for rotating the spring cap for axial adjustment relative to a valve stem, a third portion having a reduced radial wall thickness for easy crimping thereof relative to a valve stem, and a fourth portion having a coaxial recess for centering and physically retaining one end portion of a check valve compression spring.

28 Claims, 6 Drawing Sheets

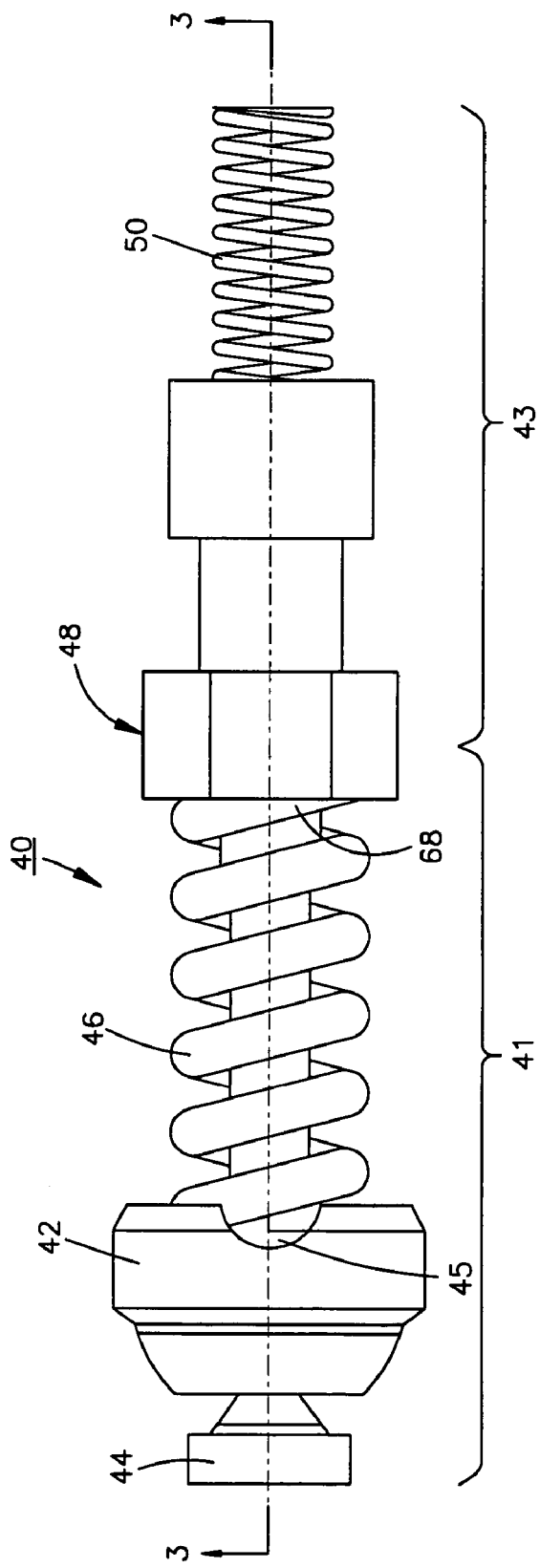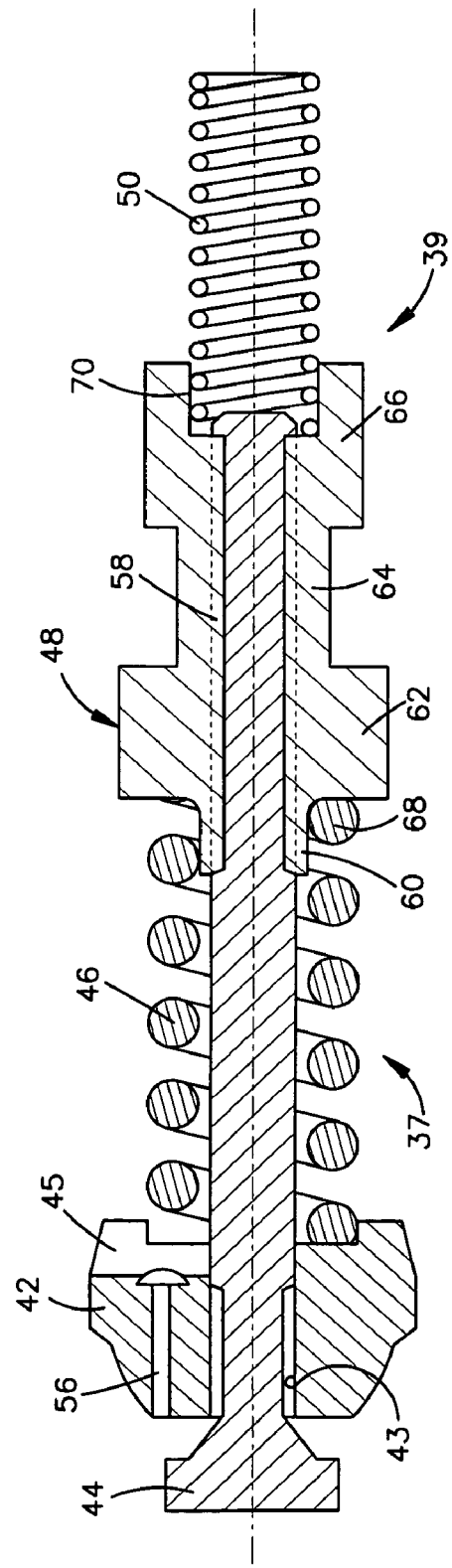

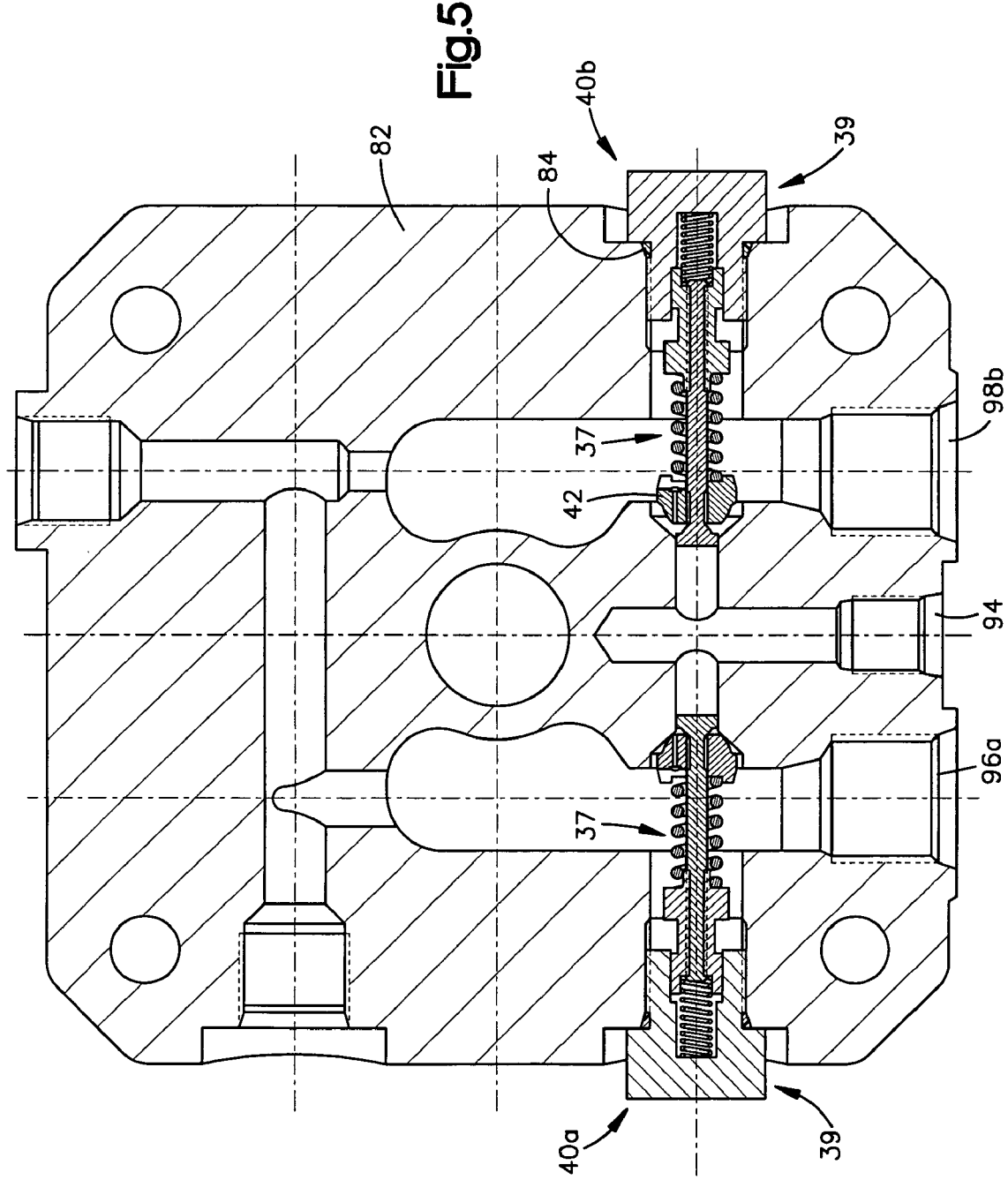

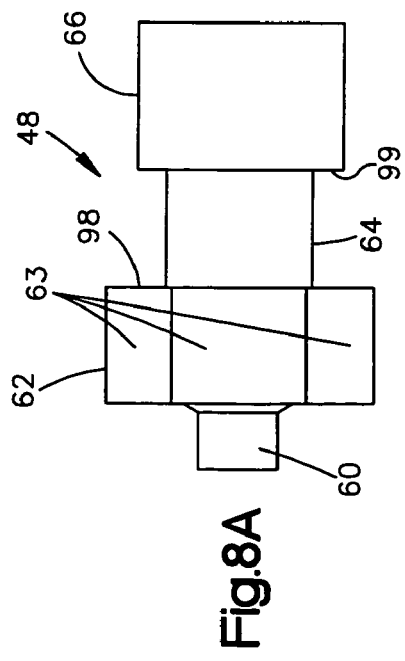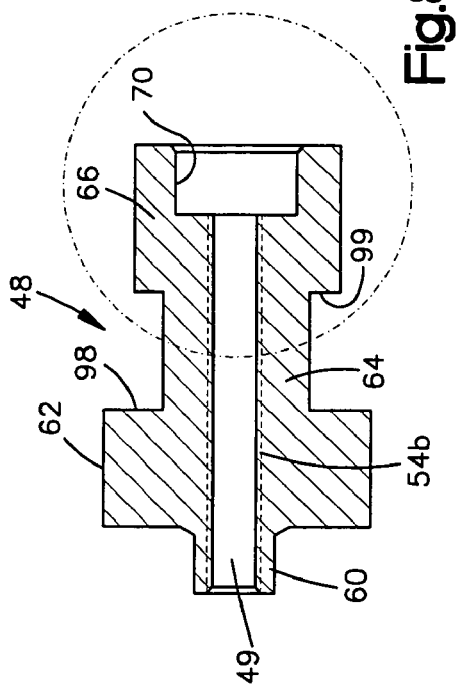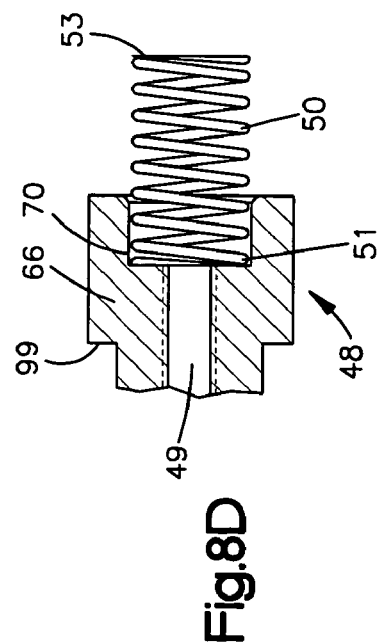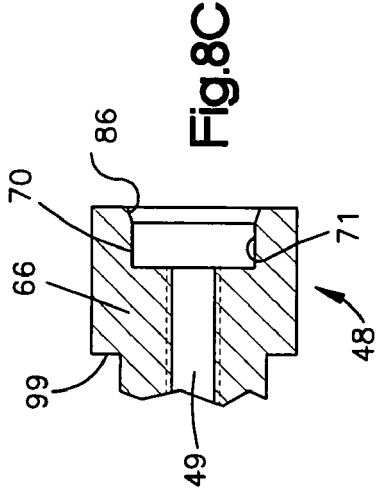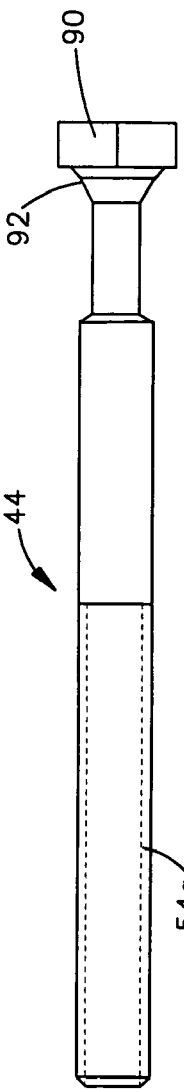

COMBINATION VALVE

CROSS-REFERENCE TO RELATED CASES

The present patent application claims the benefit from the filing date of U.S. Provisional Application No. 60/632,280, filed Dec. 1, 2004, the disclosure of which is incorporated herein by reference.

FIELD OF THE INVENTION

The present invention pertains to a combination valve, including check valve and pressure relief valve portions, for regulating the pressure of fluid flow between first and second fluid portions within a hydraulic circuit. More particularly, the invention pertains to a combination valve that utilizes an improved spring cap and an improved valve seat in combination with a valve plug, a valve stem, a check valve compression spring, and a relief valve compression spring.

BACKGROUND OF THE INVENTION

Hydrostatic transmissions have many and varied uses, including the propelling of vehicles, such as mowing machines, and offer stepless control of such a machine's speed. A typical hydrostatic transmission system includes a variable displacement main pump connected, in a closed hydraulic circuit, with a fixed displacement hydraulic motor. In order to avoid possible cavitation or excessive pressure of the closed loop, a pair of auxiliary valves is required, with each such valve consisting of a check valve and a pressure relief valve. Thus, this auxiliary or combination valve acts as a combined pressure relief and anti-cavitation valve and is sometimes also referred to as a port relief valve. Typically, such a valve is manufactured from high strength steel and basically consists of a valve seat, a valve stem, a relief valve spring, a spring cap a check valve spring and, upon installation, of an optional valve plug. The combination valve can utilize different relief pressure settings, depending upon the size of the relief valve opening and the preload of the relief valve spring. Adjustment of the working height of the relief valve spring will change the pressure setting during the initial valve assembly. Thus, after the pressure setting has been accomplished, the spring cap is locked, such as via crimping or welding, onto the valve stem so as to bias the intermediate relief valve compression spring against the valve seat.

Some prior art designs that utilize crimping to lock the spring cap to the valve stem do not utilize a positive engagement mechanism between the spring cap and the valve stem prior to the noted crimping process. As a result, the spring cap can axially move, thus making the fine adjustment of the relief valve pressure setting difficult to achieve. The crimping process of the valve cap to the valve stem has to be carried out prior to the testing of the valve and if the valve, after test, does not meet the expected pressure setting, it is discarded, resulting in unnecessary cost and waste.

The patent literature, which encompasses a large number of the previously described types of auxiliary or combination valve structures, includes, among others: U.S. Pat. No. 3,112, 763 to Tennis, et al.; U.S. Pat. No. 4,210,170 to Sutton; U.S. Pat. No. 4,300,591 to Sutton; U.S. Pat. No. 5,139,047 to Reinicke; U.S. Pat. No. 6,056,263 to Stier; U.S. Pat. No. 6,691,512 B1 to Kopel et al.; U.S. Pat. No. 6,719,005 B1 to Trimble et al.; U.S. Pat. No. 6,761,182 B1 to Trimble et al; and UK Patent Application GB 2 064 069 A to Kotter et al. However, none of these prior art structures pertain to the use of a spring cap that utilizes four successively adjoining axial portions, each of which has a particular specific function, in combination with an axially, centrally apertured, valve seat that also utilizes a first plurality of axial cross-port orifice holes, all having substantially the same diameter, and a second plurality of circumferentially-spaced, radial, semicircular holes emanating from the valve seat central aperture, wherein the first and second pluralities of holes are perpendicular to and intersect each other.

SUMMARY OF THE INVENTION

Accordingly, in order to overcome the deficiencies of the prior art devices, the present invention provides an improved combination valve structure that includes a check valve and a pressure relief valve for regulating the pressure of fluid flow and direction between a first fluid side and a second fluid side within a hydraulic circuit. This construction minimizes the required space, simplifies the assembly thereof, and improves fluid flow as well as reducing product cost.

Specifically, in terms of structure, in one embodiment of the present invention, the combination valve includes a check valve and a pressure relief valve for regulating the pressure of fluid flow between a first fluid conduit and second fluid conduit, adapted for mounting within a hydraulic circuit, the improved combination valve comprising: a. an apertured and internally-threaded relief valve spring cap movably positioned within the hydraulic circuit; b. a valve stem, having an externally-threaded portion, engaged with the spring cap; c. a check valve compression spring having one end thereof abutting the spring cap; d. a valve seat, having a central axial aperture, carried by the valve stem; and e. a relief valve compression spring interposed between the valve seat and the spring cap, wherein the improvement comprises: f. the spring cap including four successively adjoining axial portions of differing outer diameters; a first one of the axial portions taking the shape of a tubular protrusion that serves to pilot, locate and center one end portion of the relief valve compression spring; a second one of the axial portions having the largest outer diameter of the four axial portions; a third one of the axial portions having a reduced radial wall thickness to permit ready crimping of the third portion relative to an adjoining corresponding externally-threaded portion of the valve stem; and a fourth one of the axial portions having a coaxial recess in one end thereof, the recess serving to pilot, hold and physically retain one end portion of the check valve compression spring.

In one version, the improved combination valve further includes a valve plug mountable within the hydraulic circuit, the check valve compression spring being interposed between the spring cap and the valve plug.

In another version, the second and fourth portions of the spring cap each have an outer diameter greater than that of the intermediate third portion, thereby providing axial boundaries that facilitate the correct placement of a tool for crimping the third portion.

In a further version, the spring cap second portion includes multiple and successive, flat outer tool locating surfaces used for axially adjusting the location of the spring cap relative to the valve stem.

In a differing version, the recess in the spring cap includes an angled inlet chamfer to facilitate the interference-fitting of the one end of the check valve compression spring.

In yet another version, the one end of the check valve compression spring includes a reduced diameter portion to facilitate the interference-fitting thereof into the recess in the spring cap fourth portion.

In still another version, the valve seat further includes a plurality of axial cross-port orifice holes, all having one of substantially the same and a differing diameter opening. In a variation thereof, the plurality of axial cross-port orifice holes is equally peripherally spaced.

In yet a differing version, the valve seat further includes a plurality of circumferentially spaced, radial, semi-circular holes, the plurality of semi-circular holes radiating outwardly from the central axial aperture. In a variation thereof, the longitudinal central axes of the semi-circular holes are perpendicular to and intersect the longitudinal axes of the cross-port orifice holes.

Another embodiment of the present invention pertains to a combination valve having, in tandem, a pressure relief valve portion and a check valve portion, the combination valve comprising: a. the pressure relief valve portion including: i. a valve stem having an externally-threaded portion; ii. a valve seat, having a central axial aperture, carried by the valve stem; iii. a spring cap movably positioned relative to the valve seat, the valve stem being engaged with the spring cap; and iv. a relief valve compression spring interposed between the valve seat and the spring cap; and b. the check valve portion including: i. a check valve compression spring abutting one end of the spring cap and the valve plug, wherein the improvement comprises: ii. the spring cap including four successively adjoining axial portions of differing outer diameters; a first one of the axial portions taking the shape of a tubular protrusion that locates and centers one end portion of the relief valve portion compression spring; a second one of the axial portions having the largest outer diameter of the four axial portions; a third one of the axial portions having a reduced radial wall thickness to permit ready crimping of the third portion relative to an adjoining corresponding portion of the valve stem; and a fourth one of the axial portions, having a coaxial recess in one end portion thereof, the recess serving to pilot and physically retain one end portion of the check valve compression spring.

One version thereof further includes a valve plug mounted within the circuit, with the check valve compression spring being interposed between the one end of the spring cap and the valve plug.

In a further version thereof, the second and fourth portions of the spring cap each have an outer diameter greater than that of the intermediate third portion, thereby providing spaced axial boundaries that facilitate the correct placement of a tool for crimping the spring cap third portion. In a variation thereof, the spring cap second portion includes multiple, successive, flat, outer tool locating surfaces, used for axially adjusting the location of the spring cap relative to the valve stem.

In another version, the recess in the spring cap includes a tapered inlet chamfer to facilitate the interference-fitting of the one end of the check valve compression spring.

In a differing version, the one end of the check valve compression spring includes a reduced diameter portion in order to facilitate the interference-fitting thereof into the recess in the spring cap fourth portion.

In yet a further version, the valve seat further includes a plurality of equally peripherally-spaced axial cross-port orifice holes, all of the holes having one of substantially the same and a differing diameter opening.

In still another version, the valve seat further includes a plurality of circumferentially-spaced, radial, semi-circular holes, the plurality of semi-circular holes radiating outwardly from the central axial aperture. In a variation thereof, the longitudinal central axes of the semi-circular holes are perpendicular to and intersect the longitudinal axes of the cross-port orifice holes.

A further embodiment of this invention pertains to a combination valve including a check valve and a pressure relief valve for regulating the pressure of fluid flow between a first fluid portion and a second fluid portion within a hydraulic circuit, the combination comprising: a. a relief valve spring cap, having an internally-threaded central aperture, movably positioned within the hydraulic circuit; b. a valve stem, having an externally-threaded portion, engaged with the internally-threaded central aperture of the spring cap; c. a check valve compression spring abutting one end of the spring cap; d. a valve seat, having a central axial aperture, carried by the valve stem, including a plurality of axial cross-port orifice holes, all having substantially one of the same and a differing diameter opening, and a plurality of circumferentially-spaced, radial, semicircular holes, the plurality of semi-circular holes radiating outwardly from the central axial aperture; and e. a relief valve compression spring interposed between the valve seat and the spring cap.

In one version thereof, the spring cap includes four adjoining axial portions of differing outer diameters; a first axial portion being in the shape of an axial protrusion that pilots, locates and centers one end of the relief valve compression spring; a second axial portion having the largest outer diameter of the four axial portions; a third axial portion having a reduced radial wall thickness to permit easy crimping of the third portion relative to an opposed portion of the valve stem; and a fourth axial portion having a coaxial recess in one end thereof, with the recess serving to pilot, and physically retain one end portion of the check valve compression spring.

In a differing version, the spring cap second portion includes multiple and successive flat outer tool locating surfaces, used for rotating the spring cap and thereby adjusting the axial location of the spring cap relative to the valve stem.

In another version, the second and fourth portions of the spring cap each have an outer diameter greater than that of the intermediate third portion, thereby providing axial boundaries that facilitate the correct placement of a tool for crimping the third portion.

In yet a differing version, the longitudinal central axes of the semi-circular holes are perpendicular to as well as intersect the longitudinal axes of the cross-port orifice holes.

In yet a further version, wherein the spring cap further includes a tapered inlet chamfer to facilitate the press-fitting of the one end of the check valve compression spring.

In a still differing version thereof, the one end of the check valve compression spring includes a reduced diameter portion to facilitate the press-fitting thereof into the recess.

In an additional version, each of the plurality of cross-port orifice holes has substantially the same diameter opening. In a variation thereof, each of the plurality of cross-port orifice holes has a differing diameter opening.

In another embodiment, a combination valve comprises a relief valve portion comprising a valve stem, a spring cap configured for receiving a portion of the valve stem, a valve seat, and a valve spring for biasing the valve seat relative to the spring cap. The combination valve also comprises a check valve portion comprising a check valve member and a check valve spring for biasing the valve stem relative to the check valve member. The spring cap includes multiple, successively adjoined axial portions of differing outer diameters in which a first portion having a smaller diameter is interposed immediately between second and third larger diameter portions. The first portion of the spring cap is configured to be crimped into attachment with the valve stem.

In yet another embodiment, a combination valve comprises a relief valve portion comprising spring cap, a valve stem, a valve seat, and a valve spring for biasing the valve seat relative to the spring cap. The combination valve also comprises a check valve portion comprising a check valve member and a check valve spring for biasing the valve stem relative to the check valve member. The valve seat of the relief valve portion has a central axial aperture and a plurality of axial cross-port orifice holes that are spaced from one another about the central axial aperture.

BRIEF DESCRIPTION OF THE DRAWINGS

FIG. 2 is a side view of the uninstalled combination or auxiliary valve of the present invention without a valve plug;

FIG. 3 is a sectional view, taken along line 3-3 of FIG. 2;

FIG. 5 is a view, similar to that of FIG. 4, but showing the use of two such valves installed within a hydraulic pump (shown in cross-section);

FIG. 8A is a top plan view of spring cap of the present invention;

FIG. 8B is a central, vertical, longitudinal, sectional view of the spring cap of the present invention;

FIG. 8C is another version of the circled area portion of FIG. 8B;

FIG. 8D is yet a further version of the circled area portion of FIG. 8B; and

FIG. 9 is a side view of the valve stem of the present invention.

DETAILED DESCRIPTION OF THE INVENTION

Figure 1:
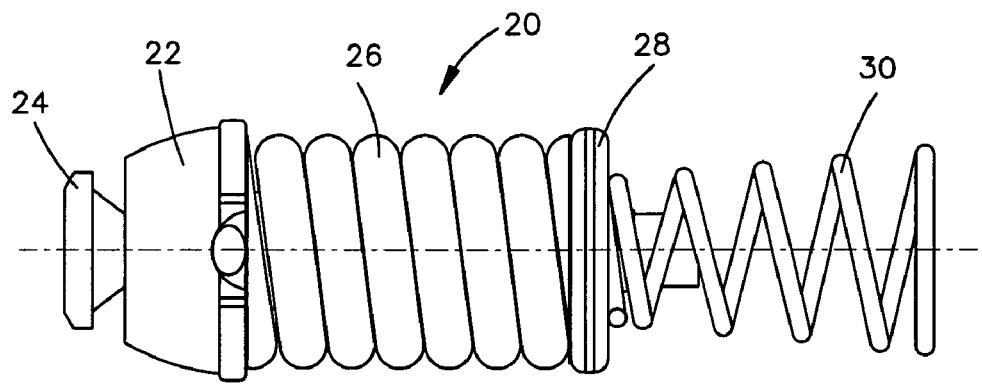
FIG. 1 is a top plan view of a typical uninstalled prior art combination valve without a valve plug.
Figure 1A:
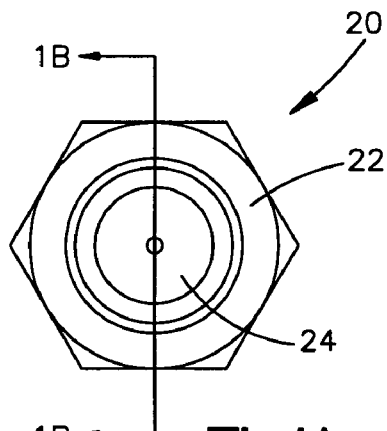
FIG. 1A is front end view of the relief valve of FIG. 1.
Figure 1B:
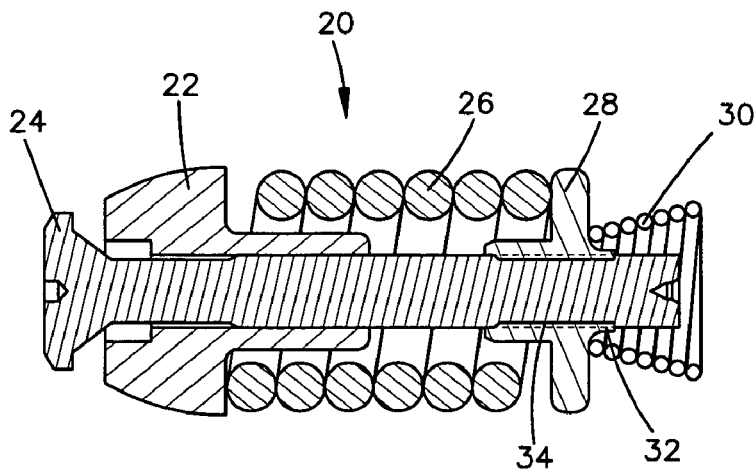
FIG. 1B is a sectional view, taken along line 1B-1B of FIG. 1A.

Referring now to the several drawings, illustrated in FIGS. 1, 1A and 1B, is a typical prior art combination or relief valve 20, generally manufactured from high strength steel, which basically consists of a valve seat 22, a valve stem 24, a relief valve spring 26, a spring cap 28, and a check valve spring 30, together with an optional valve plug (not shown but similar to valve plug 52 of FIG. 5) for confining check valve spring 30. Valve 20 can be provided with differing relief pressure settings, depending upon the size of the relief valve opening and the preload of relief valve spring 26. Adjusting the working height of relief valve spring 26 can change the noted pressure setting during the valve assembly. After the pressure setting has been accomplished, i.e., with relief valve spring 26 compressibly interposed between valve seat 22 and spring cap 28, spring cap 28 is locked or fixedly secured onto valve stem 24. The methods employed for locking spring cap 28 onto valve stem 24 normally include either welding or crimping, such as via the latter at spring cap crimp portion 32. Some prior art constructions, (not shown per se) do not utilize a positive or fixed longitudinal engagement between the valve stem and the spring cap for permitting axial adjustment therebetween prior to crimping. Therefore, the spring cap can readily move longitudinally in the axial direction, making fine adjustment of the relief valve pressure setting difficult. The crimping process is accomplished prior to the actual testing of the completed valve and, if after testing, does not meet the pressure setting expected at crimping, the valve must be discarded. Other prior art constructions, such as that of valve 20, do utilize a longitudinal engagement, such as via threads 34, between valve stem 24 and spring cap 28 prior to crimping cap 28 onto stem 24. The crimping process (of spring cap 28 to valve stem 24), takes place at a usually hexagonal spring cap crimp portion 32, close to the outer end portion of spring cap 28 and is thus difficult to control due to the minimal available space.

Figure 7:
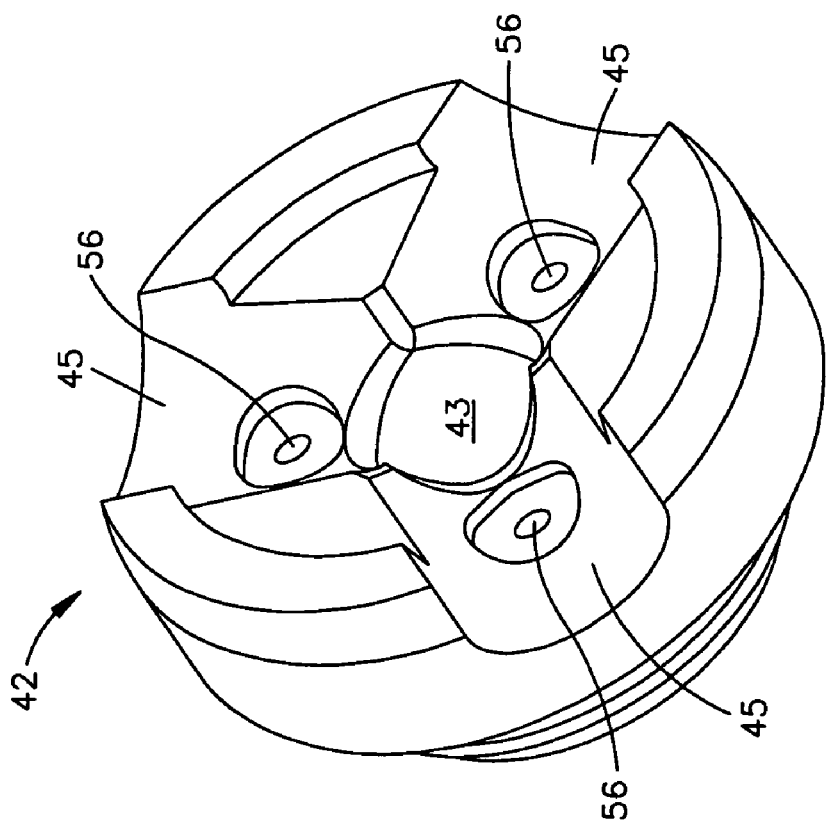
FIG. 7 is an enlarged perspective view of the inner end of the valve seat used in the present invention.
Figure 6:
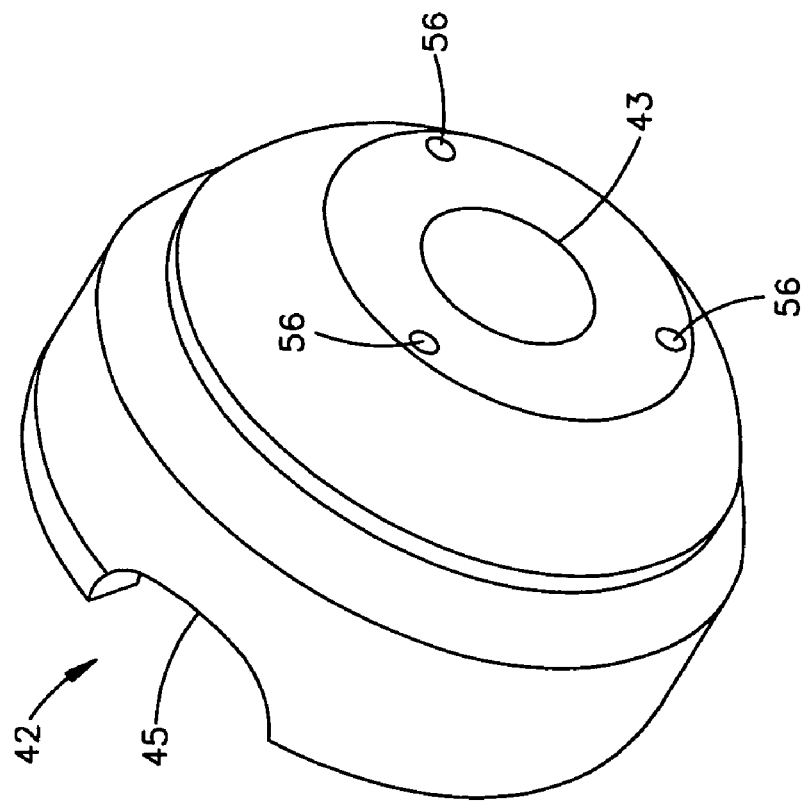
FIG. 6 is an enlarged perspective view of the outer end of the valve seat used in the present invention.

Referring now to the construction of the present invention, FIGS. 2-9 present various views of the valve of this invention; namely auxiliary or combination valve 40 and its components. Combination valve 40, which is a tandem combination of a check valve and a relief valve basically, includes a valve seat 42, a valve stem 44, a relief valve compression spring 46, and a spring cap 48, which together define a pressure relief valve portion 37 thereof. Valve 40 further utilizes spring cap 48, together with a check valve compression spring 50 and check valve plug 52 (best seen in FIGS. 4 and 5) to define an inline or integral check valve portion 39 thereof. Valve seat 42, in addition to a large axial central aperture 43, includes a plurality or series of preferably equally peripherally spaced axial holes or cross-port orifice holes 56, best seen in FIGS. 3, 4, 6 and 7. The function of cross-port orifice holes 56, in check valve seat 42, is to open the neutral deadband width of a hydrostatic transmission, driven by a hydraulic pump, that that utilizes one or more of auxiliary valves 40. The larger the cross sectional area of cross-port orifice holes 56, the wider is the noted deadband width, with deadband width referring to the non-responsive condition near the pump neutral position. Dependent upon the individual specific application, the required deadband width can vary considerably. The larger the deadband width, the more pump stroking distance is required before the vehicle starts moving and more energy loss occurs during pump operation due to the heat dissipation across cross-port orifice holes 56. Prior art designs have generally utilized but a single orifice hole in the valve seat, with differing applications requiring different hole sizes. Since such a single hole has a quite small diameter, it has, up to now, been difficult to distinguish different parts. Valve seat 42 of this invention however is equipped with multiple cross-port orifice holes 56, preferably of substantially the same size (diameter), although differing diameters can be used. Thus, depending on the number of holes, differing parts can readily be distinguished, with the number of holes, of course, having the proper relationship for achieving effective orifice operation. Instead of using but a single hole, of a differing diameter for each different application, a series of holes, preferably of the same diameter, is utilized. For example, instead of single holes having 2 or 3 millimeter. diameters, which may be difficult to distinguish visually, two holes and three holes, each of a 1 millimeter. diameter are utilized. This is best seen in the example of FIGS. 6 and 7. Valve seat 42 also includes a plurality of circumferentially-spaced, radial semi-circular, holes 45 that radiate from central axial aperture 43, with the radiating central axes of semi-circular holes 45 preferably being perpendicular to and intersecting the longitudinal axes of compression orifice holes 56.

Figure 4:
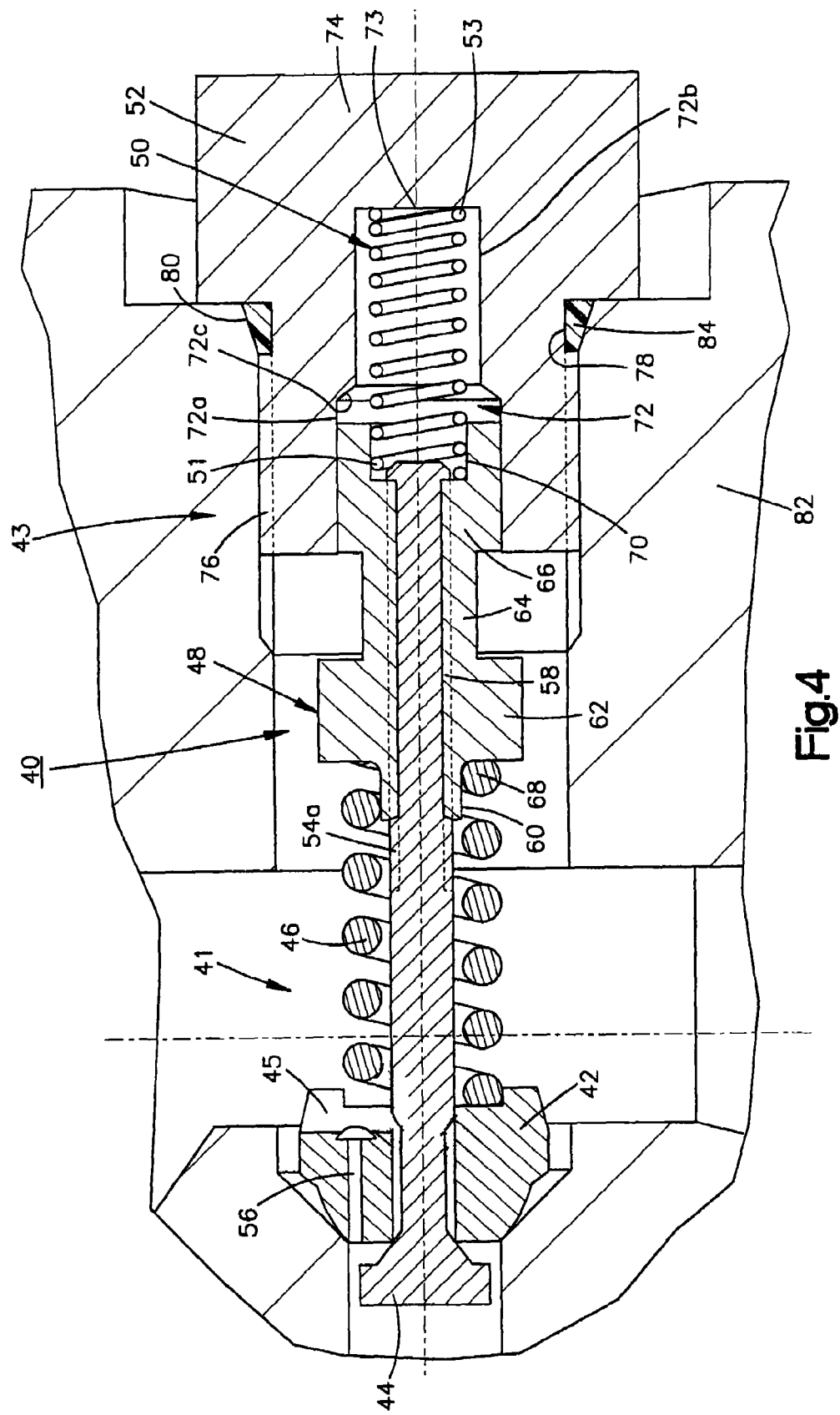
FIG. 4 is a view, similar to that of FIG. 3, showing the valve in combination with a valve plug, in an installed position.

As best seen in FIGS. 3 and 4, combination valve 40 utilizes a threaded engagement 58 between valve stem 44 and spring cap 48, for affecting relative axial adjustment therebetween, prior to making a permanent engagement. Thus, it becomes easier to fine-tune the setting of relief valve portion 37 of combination valve 40. Once valve portion 37 is tested hydraulically for compliance with the desired pressure setting, and, after the desired pressure setting is actually confirmed, spring cap 48 is then permanently crimped onto valve stem 44. The result is: less waste and lower cost as well as greater accuracy and manufacturing ease in the assembly process.

As best illustrated in FIGS. 2 and 3, in order to reduce the size of combination valve 40, particularly its overall axial length, generally tubular spring cap 48, which includes a centrally threaded (54b, shown in FIG. 8B) through aperture 49, is specifically constructed to include four adjoining segments that extend in its axial direction. As best seen in FIGS. 8A and 8B, first or inner segment 60, having the smallest outer diameter, takes the shape of a tubular protrusion that serves to pilot, locate, or center an inner peripheral surface end portion 68 of one end of relief valve spring 46. An adjoining second portion 62, having the largest outer diameter, includes multiple outer flat or tool locating portions or surfaces 63 (FIG. 8A) that can be used to adjust the valve pressure setting by rotating spring cap 48 and valve stem 44 (prior to crimping relative to each other). A continuing third segment 64, having the second smallest outer diameter, has a reduced radial wall thickness for permitting the ready crimping of this third portion of spring cap 48 onto valve stem 44. Another continuing fourth or outer segment 66, having the second largest outer diameter, includes a coaxial recess portion 70, terminating into through aperture 49, that serves to peripherally pilot, hold and/or confine the one or inner end of check valve spring 50. The larger outer diameters of second and fourth spring cap portions 62 and 66, relative to third spring cap portion 64, provide axially spaced, respective, annular walls 98, 99 that facilitate the correct placement of a tool for crimping third cap portion 64. In order to reduce the size, specifically the axial length of valve 40, it is so constructed that respective third and fourth segments 64, 66 can at least partially axially enter, as best seen in FIG. 4, the larger diameter portion 72a of a blind cavity portion 72 of check valve plug 52. Check valve plug 52, also includes a smaller diameter blind cavity portion 72b that served to locate and confine the other or outer end 53 of check valve spring 50. An annular, angular, shoulder portion 72c, located intermediate diametral portions 72a and 72b, serves as a mechanical stop or stopper for limiting the axial outward movement of spring cap fourth segment 66. Valve plug 52 further includes an integral larger diameter head portion 74 and a smaller diameter threaded outer tubular portion 76 that is separated from head portion 74 by a circumferential recess portion 78 that serves as a retainer groove for a seal member 80, such as an O-ring which, in turn, is adapted to sealingly engage and mate with a projection 84 in, for example, a pump housing 82. FIG. 5 illustrates the use of two combination or auxiliary valves, namely 40a, shown, at left, in a position where the relief valve 37 is closed while check valve 39 is open, and 40b, shown, at right, in a position where valve seat 42 of relief valve 37 is open while check valve 39 is closed. As an example, in a manner well known in the art, valves 40a and 40b are utilized to regulate hydraulic fluid flow between a first fluid conduit 94 and second and third conduits 96a, 96b, respectively.

As is best seen in FIG. 4, check valve spring 50 is not physically carried or attached to the outer end of threaded portion 54a of valve stem 44. To the contrary, the inner peripheral surface 71 of recess portion 70 is utilized to retain an adjoining peripheral end portion 51 of check valve spring 50 in an interference-fit manner, such as a press fit. FIG. 8C illustrates recess portion 70 having a tapered or angled inlet chamfer 86 to facilitate the interference fitting of end portion 51 of spring 50 (not shown in this view). FIG. 8D illustrates that the adjoining end portion 51 of valve spring 50 can be slightly tapered or reduced in diameter in order to facilitate its fitting into and retention in recess portion 70. The physical retention in recess 70, of valve spring 50, eases the assembly of combination valve 40 and assures that valve spring 50 is not inadvertently left out of the assembly. The other end of valve spring 50 abuts the inner end surface 73 of check plug cavity portion 72b, in the manner shown in FIG. 4.

In terms of the assembly of combination valve 40, it follows the conventional sequence in that the inner surface 92 of the head portion 90 of valve stem 44 consecutively serves as an abutment for valve seat 42, relief valve spring 46 and spring cap 48. Subsequently, the desired relief pressure setting is achieved by adjusting the compression of valve spring 46 by turning spring cap 48, relative to valve stem 44, via the threaded engagement 58 therebetween. After verifying the accuracy of the desired pressure setting, spring cap 48 is fixedly attached to valve stem 44 by crimping the former in the area of its cylindrical third or reduced wall thickness portion 64 so as to achieve plastic deformation between mating threads 54a and 54b that comprise thread portion 58, thus completing the assembly of relief valve portion 37. Spring cap portion 64 is tubular in shape and has a sufficiently long axial extent, thereby permitting ready access by conventional crimping tools, which is not the case with prior art valve 20 (FIG. 1B) where crimp portion 32 is difficult to control due to limited access and minimal available axial space. After the crimping operation, check valve spring 50 is attached to recess 70 in spring cap outer segment 66 in one of the ways already described. The final assembly of valve 40 includes installing same, for example, in pump housing 82, including the addition of check valve plug 52 which serves to both retain valve 40 in pump housing 82 as well as confining the free end of check valve spring 50 in plug cavity portion 72b, thus completing the assembly of check valve portion 39 as well as finishing the assembly of combination valve 40.

It should be clear at this time that centrally apertured spring cap 48, comprised of the noted four adjoining segments 60, 62, 64 and 66 serves a plurality of important functions as follows: First, tubular inner segment 60 locates and centers an inner peripheral surface end portion 68 of one end of relief valve spring 46. Second, adjoining portion 62 includes multiple outer or flat tool locating portions or surfaces 63 that can be used to turn spring cap 46, relative to valve stem 44, for adjusting the pressure setting of relief valve 37 prior to the noted crimping operation. Third, third segment 64 has a reduced radial wall thickness, a tubular shape and an axial extent sufficient to facilitate the noted crimping operation. Fourth, outer segment 66 includes recess portion 70 that serves to pilot, hold and confine one end 51 of check valve spring 50, thus assuring the inclusion of spring 50 in the valve assembly in addition to also simplifying the assembly process.

Furthermore, in order to minimize the axial extent of combination valve 40, it is so constructed that spring cap fourth segment 66 and at least an axial portion of spring cap third segment 64 can enter large diameter portion 72a of cavity portion 72 of check valve plug 52, with the smaller diameter portion 72b serving to locate and confine the outer end 53 of check valve spring 50. An intermediate shoulder portion 72c in check valve plug 52 serves as a mechanical stop for limiting the axial outward movement of spring cap fourth segment 66.

In addition, the flow characteristics through valve 40 are maximized in that the radiating central axes of semi-circular holes 45, emanating from central axial aperture 43 of valve seat 42, are perpendicular to and intersect the longitudinal central axes of cross-port orifice holes 56.

Finally, the use of a plurality or series of cross-port orifices 56, in valve seat 42, preferably of substantially the same diameter, permits easy visual differentiation of differing parts, with the number of holes having the required relationship for effective orifice operation.

It is deemed that one of ordinary skill in the art will readily recognize that the several embodiments of the present invention fill remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A combination valve including a check valve and a pressure relief valve for regulating fluid flow pressure and direction between a first fluid conduit and second fluid conduit, adapted for mounting within a hydraulic circuit, said improved combination valve comprising:

an apertured and internally-threaded relief valve spring cap movably positioned within said hydraulic circuit;
a valve stem, having an externally-threaded portion, engaged with said spring cap;
a check valve compression spring having one end thereof abutting said spring cap;
a valve seat, having a central axial aperture, carried by said valve stem; and
a relief valve compression spring interposed between said valve seat and said spring cap, wherein the improvement comprises:
said spring cap including four successively adjoining axial portions of differing outer diameters; a first one of said axial portions taking the shape of a tubular protrusion that serves to pilot, locate and center one end portion of said relief valve compression spring; a second one of said axial portions having the largest outer diameter of said four axial portions; a third one of said axial portions having a reduced radial wall thickness to permit ready crimping of said third portion relative to an adjoining corresponding externally-threaded portion of said valve stem; and a fourth one of said axial portions having a coaxial recess in one end thereof, said recess serving to pilot, hold and physically retain one end portion of said check valve compression spring.

2. The improved combination valve of claim 1, further including a valve plug mountable within said hydraulic circuit, said check valve compression spring being interposed between said spring cap and said valve plug.

3. The improved combination valve of claim 1, wherein said second and fourth portions of said spring cap each have an outer diameter greater than that of said intermediate third portion, thereby providing axial boundaries that facilitate the correct placement of a tool for crimping said third portion.

4. The improved combination valve of claim 1, wherein said spring cap second portion includes multiple, and successive, flat outer tool locating surfaces, used for axially adjusting the location of said spring cap relative to said valve stem.

5. The improved combination valve of claim 1, wherein said recess in said spring cap includes an angled inlet chamfer to facilitate the interference-fitting of said one end of said check valve compression spring.

6. The improved combination valve of claim 1, wherein said one end of said check valve compression spring includes a reduced diameter portion to facilitate the interference-fitting thereof into said recess in said spring cap fourth portion.

7. The improved combination valve of claim 1, wherein said valve seat further includes a plurality of axial cross-port orifice holes, all having one of substantially the same and a differing diameter opening.

8. The improved combination valve of claim 7, wherein said plurality of axial cross-port orifice holes is equally peripherally spaced.

9. The improved combination valve of claim 1, wherein said valve seat further includes a plurality of circumferentially spaced, radial, semi-circular holes, said plurality of semi-circular holes radiating outwardly from said central axial aperture.

10. The improved combination valve of claim 9, wherein the longitudinal central axes of said semi-circular holes are perpendicular to and intersect the longitudinal axes of said cross-port orifice holes.

11. In a hydraulic circuit, a combination valve having, in tandem, a pressure relief valve portion and a check valve portion, said combination valve comprising:

a. said pressure relief valve portion including:
i. a valve stem having an externally-threaded portion;
ii. a valve seat, having a central axial aperture, carried by said valve stem;
iii. a spring cap movably positioned relative to said valve seat, said valve stem being engaged with said spring cap; and
iv. a relief valve compression spring interposed between said valve seat and said spring cap; and b. said check valve portion including:
i. a check valve compression spring abutting one end of said spring cap and said valve plug, wherein the improvement comprises:
said spring cap including four successively adjoining axial portions of differing outer diameters; a first one of said axial portions taking the shape of a tubular protrusion that locates and centers one end portion of said relief valve portion compression spring; a second one of said axial portions having the largest outer diameter of said four axial portions; a third one of said axial portions having a reduced radial wall thickness to permit ready crimping of said third portion relative to an adjoining corresponding portion of said valve stem; and
a fourth one of said axial portions, having a coaxial recess in one end portion thereof, said recess serving to pilot and physically retain one end portion of said check valve compression spring.

12. The improved combination valve of claim 11, further including a valve plug mounted within said circuit, with said check valve compression spring being interposed between said one end of said spring cap and said valve plug.

13. In the improved combination valve of claim 11, wherein said second and fourth portions of said spring cap each have an outer diameter greater than that of said intermediate third portion, thereby providing spaced axial boundaries that facilitate the correct placement of a tool for crimping said spring cap third portion.

14. In the improved combination valve of claim 13, wherein said spring cap second portion includes multiple, successive, flat, outer tool locating surfaces, used for axially adjusting the location of said spring cap relative to said valve stem.

15. In the improved combination valve of claim 11, wherein said recess in said spring cap includes a tapered inlet chamfer to facilitate the interference-fitting of said one end of said check valve compression spring.

16. In the improved combination valve of claim 11, wherein said one end of said check valve compression spring includes a reduced diameter portion in order to facilitate the interference-fitting thereof into said recess in said spring cap fourth portion.

17. In the improved combination valve of claim 11, wherein said valve seat further includes a plurality of equally peripherally-spaced axial cross-port orifice holes, all of said holes having one of substantially the same and a differing diameter opening.

18. In the improved combination valve of claim 11, wherein said valve seat further includes a plurality of circumferentially-spaced, radial, semi-circular holes, said plurality of semi-circular holes radiating outwardly from said central axial aperture.

19. In the improved combination valve of claim 18, wherein the longitudinal central axes of said semi-circular holes are perpendicular to and intersect the longitudinal axes of said cross-port orifice holes.

20. A combination valve including a check valve and a pressure relief valve for regulating fluid flow pressure and direction between a first fluid portion and a second fluid portion within a hydraulic circuit, said combination comprising:
 a relief valve spring cap, having an internally-threaded central aperture, movably positioned within said hydraulic circuit;
 a valve stem, having an externally-threaded portion, engaged with said internally-threaded central aperture of said spring cap;
 a check valve compression spring abutting one end of said spring cap;
 a valve seat, having a central axial aperture, carried by said valve stem, including a plurality of axial cross-port orifice holes, all having substantially one of the same and a differing diameter opening, and a plurality of circumferentially-spaced, radial, semicircular holes, said plurality of semi-circular holes radiating outwardly from said central axial aperture; and
 a relief valve compression spring interposed between said valve seat and said spring cap.

21. The combination valve of claim 20, wherein said spring cap includes four adjoining axial portions of differing outer diameters; a first axial portion being in the shape of an axial protrusion that pilots, locates and centers one end of said relief valve compression spring; a second axial portion having the largest outer diameter of said four axial portions; a third axial portion having a reduced radial wall thickness to permit easy crimping of said third portion relative to an opposed portion of said valve stem; and a fourth axial portion having a coaxial recess in one end thereof, with said recess serving to pilot, and physically retain one end portion of said check valve compression spring.

22. The combination valve of claim 21, wherein said spring cap second portion includes multiple and successive flat outer tool locating surfaces, used for rotating said spring cap and thereby adjusting the axial location of said spring cap relative to said valve stem.

23. The combination valve of claim 21, wherein said second and fourth portions of said spring cap each have an outer diameter greater than that of said intermediate third portion, thereby providing axial boundaries that facilitate the correct placement of a tool for crimping said third portion.

24. The combination valve of claim 20, wherein the longitudinal central axes of said semi-circular holes are perpendicular to as well as intersect the longitudinal axes of said cross-port orifice holes.

25. The combination valve of claim 20, wherein said spring cap further includes a tapered inlet chamfer to facilitate the press-fitting of said one end of said check valve compression spring.

26. The combination valve of claim 20, wherein said one end of said check valve compression spring includes a reduced diameter portion to facilitate the press-fitting thereof into said recess.

27. The combination of claim 20, wherein each of said plurality of cross-port orifice holes has substantially the same diameter opening.

28. The combination of claim 20, wherein each of said plurality of cross-port orifice holes has a differing diameter opening.

* * * * *